(12) United States Patent
Barak

(10) Patent No.: US 10,974,154 B2
(45) Date of Patent: Apr. 13, 2021

(54) SYSTEM AND METHOD FOR MULTIPLAYER GAMING

(71) Applicant: Electronic Arts Inc., Redwood City, CA (US)

(72) Inventor: Asaf Barak, Yoknewam (IL)

(73) Assignee: Electronic Arts Inc., Redwood City, CA (US)

( * ) Notice: Subject to any disclaimer, the term of this patent is extended or adjusted under 35 U.S.C. 154(b) by 99 days.

(21) Appl. No.: 14/136,993

(22) Filed: Dec. 20, 2013

(65) Prior Publication Data

US 2015/0174478 A1   Jun. 25, 2015

(51) Int. Cl.
| | |
|---|---|
| *A63F 9/24* | (2006.01) |
| *A63F 13/00* | (2014.01) |
| *G06F 17/00* | (2019.01) |
| *A63F 13/795* | (2014.01) |
| *A63F 13/355* | (2014.01) |

(52) U.S. Cl.
CPC .......... *A63F 13/795* (2014.09); *A63F 13/355* (2014.09)

(58) Field of Classification Search
CPC ............ G07F 17/3202; G07F 17/3223; G07F 17/323; G07F 17/3272; G07F 17/3274; G07F 17/3276; G07F 17/3279; G07F 17/3281; G07F 17/3283
See application file for complete search history.

(56) References Cited

U.S. PATENT DOCUMENTS

| | | | |
|---|---|---|---|
| 6,409,602 B1* | 6/2002 | Wiltshire | A63F 3/081 463/16 |
| 8,727,892 B1* | 5/2014 | Chun | 463/42 |
| 2002/0137562 A1* | 9/2002 | Malone | G07F 17/3286 463/19 |
| 2003/0130040 A1* | 7/2003 | Dripps | A63F 13/12 463/42 |
| 2004/0063498 A1* | 4/2004 | Oakes | A63F 13/12 463/42 |
| 2006/0258463 A1* | 11/2006 | Cugno | A63F 13/12 463/42 |
| 2009/0083753 A1* | 3/2009 | Tzruya | G06F 9/4843 718/107 |

(Continued)

OTHER PUBLICATIONS

Cohen-Or, Daniel, Mar. 30, 2004 (retrieved Dec. 17, 2018), "Streaming Scenes to MPEG-4 Video Enabled Devices", <https://web.archive.org/web/20040330171606/http://www.cs.tau.ac.il/~dcor/online_papers/papers/mpeg03.pdf> (Year: 2004).*

(Continued)

*Primary Examiner* — Kang Hu
*Assistant Examiner* — Jason Pinheiro
(74) *Attorney, Agent, or Firm* — McDermott Will & Emery LLP

(57) ABSTRACT

A computer-implemented method, apparatus and computer program product for gaming, the computer-implemented method performed by a computerized device, and comprising: starting a single game session for two or more players using two or more end units, wherein the two players are located at different geographic locations; receiving a game command from one of the end units; providing the game command to the game session; receiving from the game session a video stream comprising one or more video frames; and transmitting the video frames to the end units.

14 Claims, 6 Drawing Sheets

(56) References Cited

U.S. PATENT DOCUMENTS

| | | | |
|---|---|---|---|
| 2011/0185312 A1* | 7/2011 | Lanier | G06Q 20/102 715/810 |
| 2011/0275432 A1* | 11/2011 | Lutnick et al. | 463/25 |
| 2011/0300917 A1* | 12/2011 | Hill | 463/11 |
| 2012/0011189 A1* | 1/2012 | Werner | H04L 29/12471 709/202 |
| 2013/0210530 A1* | 8/2013 | Nguyen | 463/42 |
| 2015/0080130 A1* | 3/2015 | Tanibuchi | A63F 13/65 463/31 |

OTHER PUBLICATIONS

Hemy, M., et al., "MPEG System Streams in Best-Effort Networks", Jun. 1999, https://www.researchgate.net/publication/2267969_MPEG_System_Streams_in_Best-Effort_Networkspp., pp. 1-11.

* cited by examiner

SYSTEM AND METHOD FOR MULTIPLAYER GAMING

TECHNICAL FIELD

The present disclosure relates to gaming in general, and to a method and apparatus for providing multiplayer games in cloud gaming, in particular.

BACKGROUND

Traditional video games are played by a single player using a computer or a dedicated gaming environment, in which the player is challenged by the game to achieve certain goals. In some games the player is playing with, playing against, or competes with another "player", which is programmed by the game and is not related to any real player.

However, such games lack the human dimension and communication with other people, and the flexibility and originality of human thinking. This brought up the concept of multiplayer game, in which two or more players participate in the same game. The two or more players may act as competitors, rivals, partners acting against a common enemy or for achieving a common goal, supervise one another's activities, or the like. Multiplayer games thus require communication of some sort between the players, for example planning, cooperating, sharing resources, or the like.

In some embodiments of multiplayer games, for example when the participants compete, a split screen view may be displayed, in which each player may see a view of the game associated with the player's avatar, vehicle or the like, and may also see the other payer's view. For example, in a car race game, the players may see on one pane, for example the top pane of the display, the view from the driver's sit of a car associated with or controlled by the first player, such that the other car may also be seen, and on another pane the view from the driver's seat of the other car, in which the first car may also be seen.

In other embodiments, for example when the players fight each other, both players may see the same view showing their avatars fighting, with the relevant background.

Multiplayer games are provided in a number of configurations.

A first configuration relates to two or more players each using a game pad, wherein the players are co-located at the same physical location, and the game pads are connected to a single console or computer executing the game.

In another configuration, each player may be located at a different geographic location, and each may use a different console or computer executing the game. The two consoles or computers may communicate through a server which may transfer messages between the consoles or computers, for synchronizing the game, notifying each game about the actions of the other player, or the like. In some embodiments, one of the consoles or computers is the server that provides communication between the two executed games. In such configuration, the consoles or computers need to belong to the same Local Area Network (LAN), to enable this communication. As the name suggests, although the players may not be collocated in the same room, they are still required to have access to the same LAN and therefore cannot be in distant locations.

In yet another configuration, referred to as cloud gaming, the game played by each player is executed by a server which is typically remote and not specifically associated with the player or the player's network, rather than by a computing platform such as a console. Cloud games provides for higher flexibility, as the player does not have to pre-purchase the game but can rather use a pay-per-play approach, a flexible subscription, or the like.

The player in cloud gaming may use a game pad connected to an end unit which receives the video signal from the server and sends commands such as commands related to the player's actions, but does not execute the actual game. In a multiplayer game, for example when two players are playing, the end unit of each player typically communicates with a server executing the player's game. Thus, two or more servers execute the game, and may communicate via an additional server which manages the communication. Alternatively, the additional server is one of the at least two servers.

Yet another configuration relates to co-located cloud gaming, in which the players use two gamepads connected to the same end unit, such that the players see the same video, but the game is executed as one session on a remote server, rather than locally. Each of the options mentioned above has its drawbacks: in collocated gaming, whether the players connect to the same console in which case the end unit or to the same and session is executed locally or by a remote server, the players are required to be co-located, in playing over LAN the players may have to belong to the same LAN which also limits their geographic location, and in cloud gaming the game requires high resources from the servers and high communication bandwidth, thus limiting the number of simultaneous games.

BRIEF SUMMARY

One exemplary embodiment of the disclosed subject matter is a computer-implemented method performed by a computerized device, comprising: starting a single game session for two or more players using two or more end units, wherein the two players are located at different geographic locations; receiving a game command from one of the end units; providing the game command to the game session; receiving from the game session a video stream comprising one or more video frames; and transmitting the video frames to the end units. Within the computer-implemented method, the players optionally use cloud gaming. The computer-implemented method can further comprise maintaining infrastructure related to the game or to one or more of the players. The computer-implemented method can further comprise analyzing the video frames obtain information related to the game. Within the computer-implemented method, the information optionally relates to one player winning a game. Within the computer-implemented method, the information optionally relates to an achievement of one player. The computer-implemented method can further comprise transmitting a wait notice to one of the end units wherein a user of another of the end units is selecting a tool or an avatar.

Another exemplary embodiment of the disclosed subject matter is an apparatus having a processing unit and a storage device, the apparatus comprising: a gaming application comprising: an end unit communication component for receiving input from two or more end units and transmitting a video stream to the end units located in two or more remote locations; and a game communication component for transmitting the input to an executed game and receiving the video stream from the executed game, wherein the gaming application is a single gaming application communicating with the end units. Within the apparatus, the gaming application optionally provides for cloud gaming. The apparatus can further comprise an infrastructure maintenance component for maintaining information related to the game or to a player using one or more of the end units. The apparatus can further comprise a video analysis component for analyzing one or more video frames of the video stream to obtain information related to the executed game. Within the apparatus, the information optionally relates to one player winning a game. Within the apparatus, the information optionally relates to an achievement of one player.

Yet another exemplary embodiment of the disclosed subject matter is a computer program product comprising: a non-transitory computer readable medium; a first program instruction for starting a single game session for two or more players using two or more end units, wherein the players are located at two or more different geographic locations; a second program instruction for receiving a game command from one of the end units; a third program instruction for providing the game command to the game session; a fourth program instruction for receiving from the game session a video stream comprising one or more video frames; and a fifth program instruction for transmitting the video frames to the end units, wherein said first, second, third, fourth, and fifth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
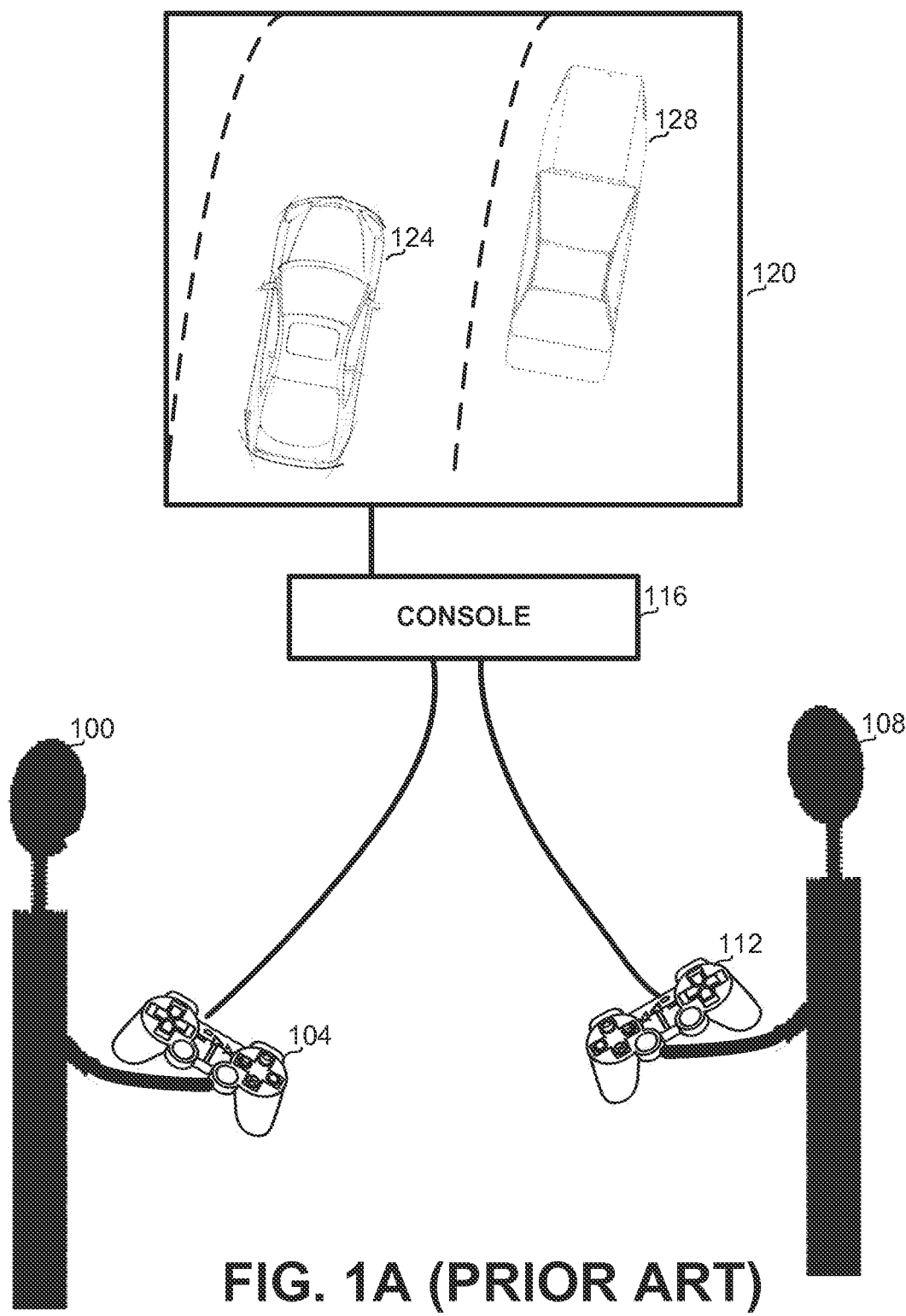
FIG. 1A shows an illustration of a local multiplayer game played by collocated players.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to provide multiplayer game in cloud gaming environments. Currently, cloud gaming requires the gamepad of each player to communicate with a remote server, such that a game session executed by the remote server provides the logic of the game and renders the video, wherein the video is sent to the console or gamepad by the server. Thus, each session generates a separate video stream and the different streams are sent separately to the consoles. The two servers typically communicate via a third server. The number of involved servers may be reduced to two if the communicating server is one of the executing servers, or even to one if the two game sessions are executed by the same server which also provides communication between the sessions. Each game pad or console receives the video stream from the server associated therewith. However, any of these configurations requires the execution of two separate sessions, thus limiting the number of games that may be provided. For example, if ten player pairs wish to play, a total of twenty games have to be executed by the various servers.

Another technical problem dealt with by the disclosed subject matter is the need to coordinate sessions started by the different players into a multiplayer game. If players are using different sessions in cloud computing, there is no convenient way of coordinating the sessions, e.g., determining that the game is to be played as a multiplayer game, setting turns for each player to choose an avatar, a vehicle or another tool such that the players do not select the same tool, notifying a winning, or the like. The server used for communication between the two sessions is not associated with the various games enabled but merely passes messages between the sessions, and thus has no way of determining stages of the game, specific events or achievements, or the like. Thus, there is currently no structured method or system for connecting two non-collocated players who wish to play a multiplayer game into a single game.

One technical solution comprises the execution on a remote server, of a single specific gaming session such that two or more game pads or end units communicate with the gaming session, similarly to the case of collocated players having their gamepads connected to the same console or computer. However, the players do not need to be collocated, and each of the players may use cloud gaming rather than a locally executed game. The server may also execute a gaming application for communicating with the game pads or end units of the players, send video streams and receive commands.

The gaming application may send the same video as rendered by the specific game session to the two players, such that the two players see exactly the same view as if they were collocated and looking at the same display device. This combines the benefits of collocated players whose gamepads connect to the same console executing a single instance of the game, which include a single video stream seen by the players, with the benefits of cloud computing being the greater flexibility and the options for remote players to play with each other.

Another technical solution relates to the gaming application being active in managing the game, for example receiving game requests from different players and matching players based on parameters such as skill level, geographic location, or others.

It will be appreciated that the gaming application may not have an analytic or systematic way of receiving information from the specific game session. For example, the specific game may not have a predetermined API through which the gaming application can query it, since the gaming application may offer to a player a multiplicity of games, wherein the offering may change over time and may include games from various sources and not necessarily games complying with a required API. Thus, in order to recognize various events or achievements in the game, the gaming application may analyze the video rendered by the specific games. For example, victory of one of the players may be identified by a large star being displayed. This also enables the gaming application to keep track of wins, losses and score keeping for the players, award players for various achievements such as three wins in a row, or the like.

The gaming application may also provide for synchronizing the tool selection by the players. For example, when two players are matched and want to start playing, the gaming application may enable each player to select a tool and in the meantime present to the other player a "Please Wait" notice.

One technical effect of the disclosed subject matter is the provisioning of a method and apparatus for multiplayer game for non-collocated players, such that the players see exactly the same video. Thus, multiplayer gaming is extended from local games to cloud gaming service, which may also be referred to as challenge mode.

Another technical effect of the disclosed subject matter is the reduced resource consumption achieved by two players using the same instance of game application, instead of executing two instances which communicate there between.

This enables a gaming provider to support up to twice the number of players with the same number of sessions executed by the available servers (if a game is enabled for more than two players, this number can grow further).

Another technical effect of the of the disclosed subject matter is the provisioning of a "wrapper" layer, for example a gaming application, which receives commands from the end units and passes them to the specific games, receives video streams from the specific games and passes them to the end unit, and may also provide for player registration and matching, score keeping and awarding, and other infrastructure features.

Referring now to FIG. 1A showing an illustration of a local multiplayer game configuration. Player 100 is using game pad 104 and player 108 is using game pad 112, wherein player 100 and player 108 are collocated, i.e., present at the same geographic location, and game pad 104 and game pad 112 are connected to one console 116. Console 116 executes a game that supports multiple players and the video stream generated by console 116 is displayed on display device 120, such as a television, an LCD display, or the like, seen by players 100 and 108. Display 120 shows elements such as vehicles, avatars or the like, controlled by player 100 and player 108, for example car 124 controlled by one of the players and car 128 controlled by the other player. In such configuration, the video displayed on display device 120 is generated once and sent to display device 120, such that player 100 and player 108 naturally watch exactly the same video. It will be appreciated that different display modes may be used. For example, the view from within one of the cars, which includes the other car, may be shown on an upper part of the display, and the view from within the other car, which includes the first car, may be shown on a lower part of the display. Some games, for example wrestling games, are better viewed in a single pane showing both avatars, while other games, which may be of more competitive nature, may be shown in one pane or in different panes.

Figure 1B:
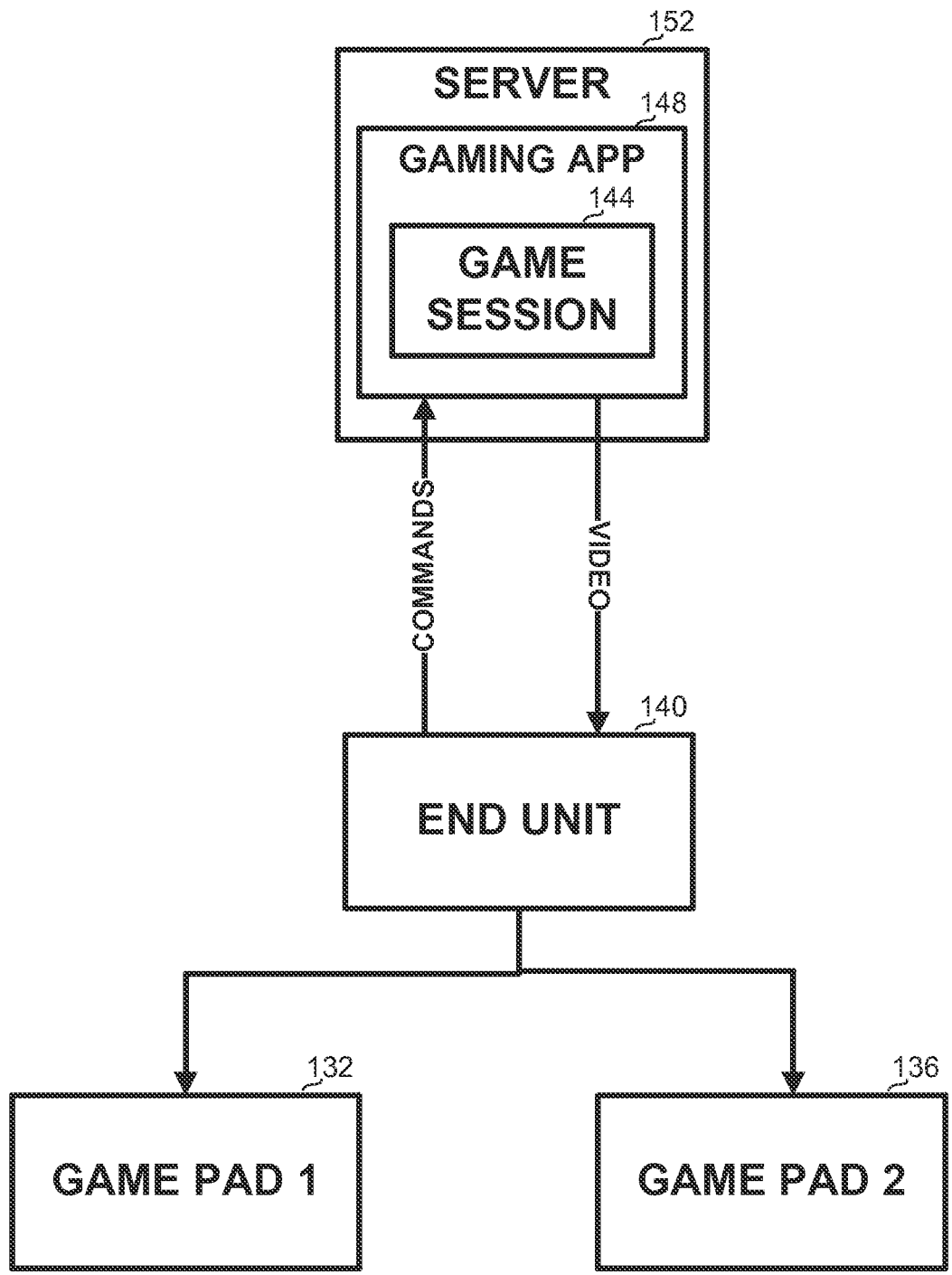
FIG. 1B shows a schematic illustration of a prior art system used by collocated players of a multiplayer game executed by an online game server in a cloud computing game.

Referring now to FIG. 1B, showing a schematic illustration of a prior art system used by collocated players of a LAN or online multiplayer game in a cloud computing game.

In this configuration, a first player (not shown) is using game pad 1 (132) connected to end unit 140 to connect to a server 152, and a second player (not shown) collocated with the first player is using game pad 2 (136) connected to the same end unit 140 to connect to server 152. Server 152 may be a part of a cloud computing system, and may geographically reside anywhere, for example remote form the players.

Server 152 which may be implemented as any computing platform is executing a gaming application 148, which serves as a "wrapper" for, or communicates with a game session 144 which executes the specific multiplayer game selected by the players.

Gaming application 148 enable the players to play the game by providing access to game session 144.

Thus, although the two players participate in an online cloud game, they are still required to be at the same location, This severely limits the number of clients that may be served at any given time. If ten games are played, twenty game sessions are executed, and additional servers may be used for communication.

Figure 2:
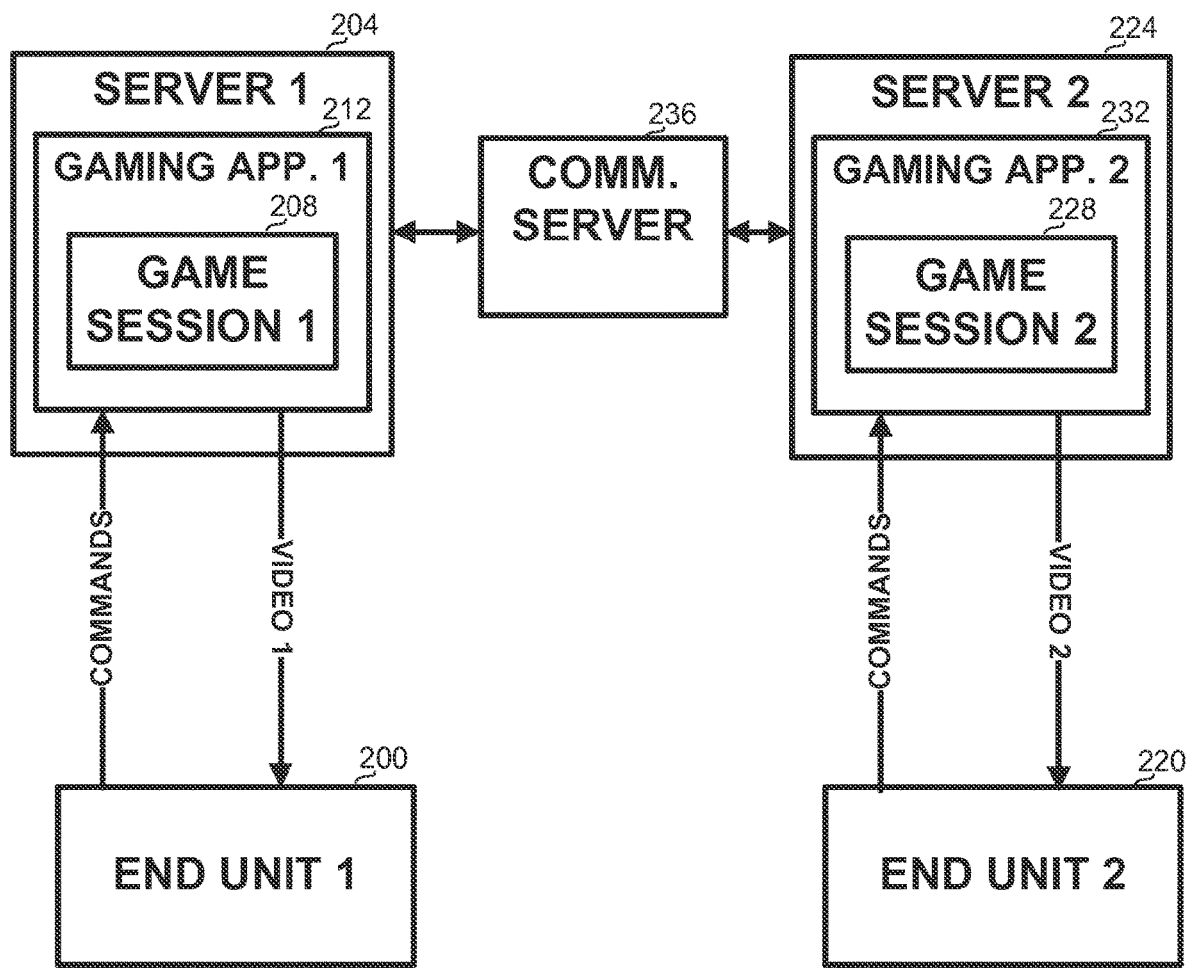
FIG. 2 shows a schematic illustration of a prior art system used by players of a multiplayer game executed by two or more online game servers in a cloud computing game.

Referring now to FIG. 2, showing a schematic illustration of a prior art system used by players of a LAN or online multiplayer game in a cloud computing game.

In this configuration, a first player (not shown) is using end unit 1 (200) or a first console to connect to server 1 (204), and a second player (not shown) is using end unit 2 (220) or a second console to connect to server 2 (224). Server 1 (204) and server 2 (224) are part of a cloud computing system, and each may geographically reside anywhere. The first player and the second player are also not required to be collocated. Thus, all the associated players and servers may be present at totally different locations, such as different rooms, buildings, cities, countries or continents.

Server 1 (204) which may be implemented as any computing platform is executing gaming application 1 (212), which serves as a "wrapper" for, or communicates with game session 1 (208) which executes the specific game selected by the players. Similarly, server 2 (224) is executing gaming application 2 (232), which serves as a "wrapper" to, or communicates with game session 2 (228).

Gaming application 1 (212) and gaming application 2 (232) enable the players to play the game by providing access to game session 1 (208) and game session 2 (228), respectively. Game session 1 (208) and game session 2 (228) communicate through communication server 236 in order to provide notifications about users' actions and status. For example, game session 1 (208) may be notified about the first player pressing on a particular button, and may take the relevant actions and generate the corresponding video, and may also notify game session 2 (228) which analyzes the situation and also generates a video.

Thus, although the two players participate in the same game, two different instances are created, being game session 1 (208) and game session 2 (228), three servers are active in providing the game, and two video streams are created and sent to end unit or console 1 (200) and end unit or console 2 (220).

This severely limits the number of clients that may be served at any given time. If ten games are played, twenty game sessions are executed, and additional servers may be used for communication.

Although server 1 (204) and server 2 (224), and optionally also communication server 232 may be the same server, such that between one and three servers are used, two copies of the game session, being game session 1 (208) and game session 2 (228) are instantiated, and two video streams are generated and sent to the end units, thus limiting the enabled gaming density.

Figure 3:
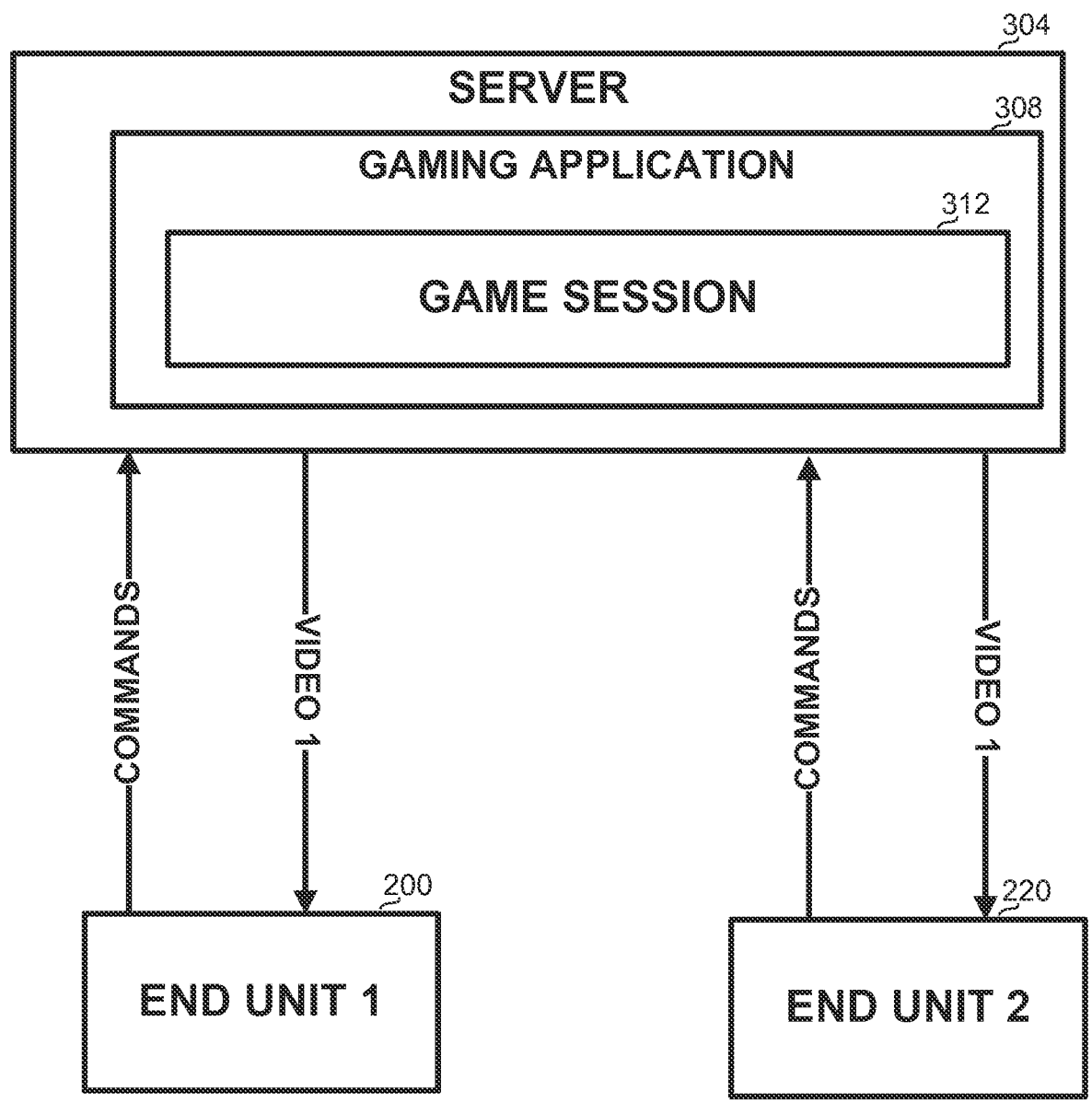
FIG. 3 shows an illustration of the a configuration used by players of a multiplayer game in a cloud computing game, in accordance with some exemplary embodiments of the disclosed subject matter.

Referring now to FIG. 3, showing an illustration of a configuration used by players of a multiplayer game in a cloud computing game.

In this configuration, two players use end unit 1 (200) and end unit 2 (220) that connect to one server 304. Server 304 executes one gaming application 308 per game, and one game session 312.

Gaming application 308 receives inputs provided by the players to end unit 1 (200) and end unit 2 (220), transfers them to game session 312, receives a single video stream from game session 312 and sends the same video stream to end unit 1 (200) and end unit 2 (220).

Thus, per each game played, whether by one, two or more players, a single game session 312 is instantiated, and the communication to the players is provided by a single gaming application 312. It will, however, be appreciated that a single gaming application 312 may provide services to multiple game sessions such as game session 312, serving multiple groups of users playing multiplayer games.

The method and apparatus for providing a gaming environment of FIG. 3 thus provide for extending a multiplayer game in which the players had to be collocated, whether the multiplayer game was executed locally on a remote server, into a multiplayer game in which the players can be located at different locations, without creating redundant burden on the online computing system such as the cloud.

It will be appreciated that game session 312 may not be specifically adapted for communicating with gaming application 308 and may thus have its own or even proprietary Application Program Interface (API). Therefore gaming application 308 may be adapted to use the API of game session 312, which is adapted for receiving input and sending a video stream. However, since the video stream which includes video frames is provided to gaming application 308, gaming application 308 may be adapted to analyze events and achievements in the video stream. By analyzing the video stream, gaming application 308 may recognize wins or losses, specific events like a car finishing a race, determine collected point or the like. Gaming application 308 may use this information, for example to hold a score count, to match players upon their level or another parameter which may be known through the player's registration to the server, or the like.

Gaming application 312 may also be operative in synchronizing the non-common parts of the game such as the vehicle, avatar or tool selection. For example, when it is determined that two players are matched, gaming application 312 may halt the video stream to the first player and transmit instead frames showing a "Please Wait" notice, thus letting the second player select a tool, and then halt the video stream to the second player and transmit instead frames with the "Please Wait" notice while the first player selects a tool.

Figure 4:
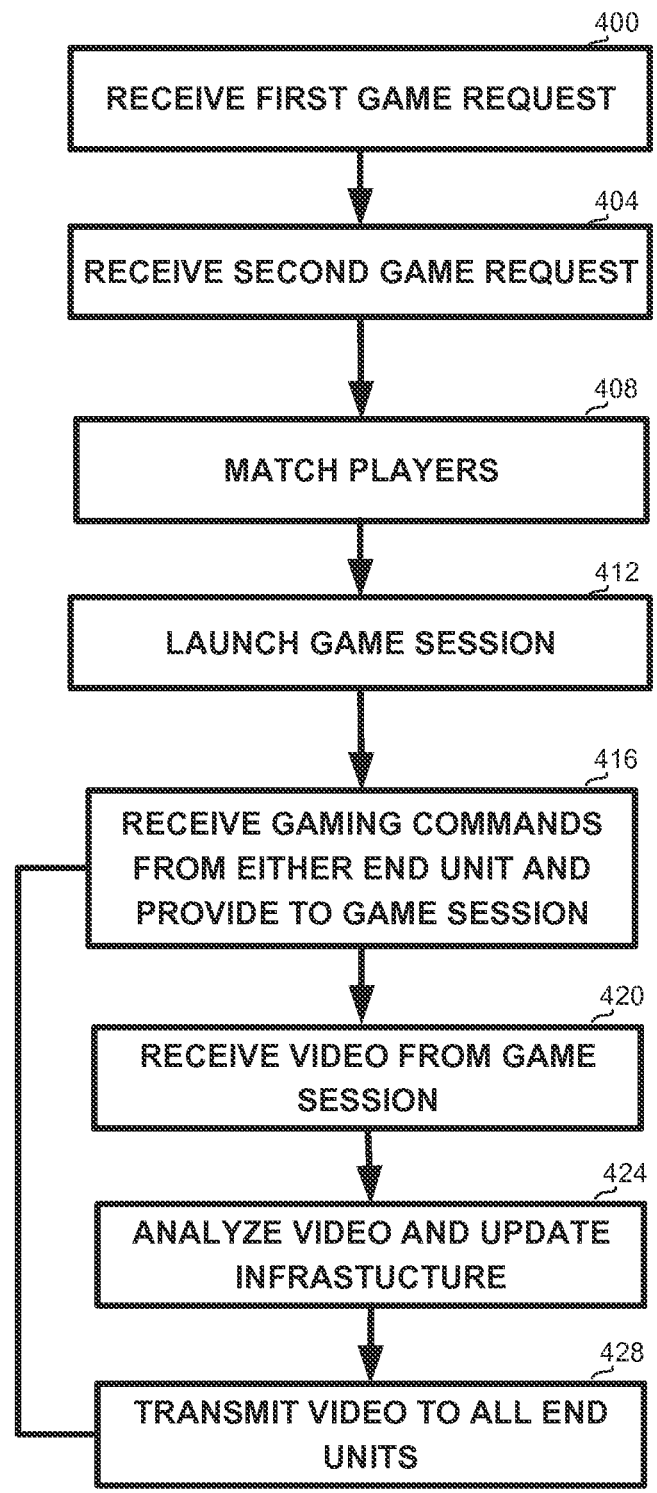
FIG. 4 shows a block diagram of an apparatus for providing multiplayer games in a cloud computing environment, in accordance with some exemplary embodiments of the disclosed subject matter.

Referring now to FIG. 4, showing steps in a method for providing multiplayer games in a cloud computing environment. The method may be performed by a gaming application such as gaming application 312 of FIG. 3.

On step 400 a first game request may be received from a first user, for example from a subscriber, an occasional player, or the like, using a remote device such as a game pad and console, a computer or any other computing platform equipped with or connected to input or output devices such as a joystick, one or more buttons, a mouse, a touch sensor, a microphone, a display device, one or more speakers or the like.

Similarly to step 400, on step 404 a second game request may be received from a second user.

On step 408 gaming application 312 may match the first and the second players and optionally additional players for a multiplayer game. Gaming application 312 may maintain infrastructure related to one or more games. The infrastructure may include a list or another data structure of pending gaming requests and the players, and may match pairs of players according to specific requests, or may match unrelated players based on skill, geographic location or another parameter.

On step 412, gaming application 312 may launch a game session, such as game session 312 of FIG. 3, such that the first and the second players are associated with this game session. It will be appreciated that the same game session may be started for a single player, or two or more players, depending on the specific game. If more than one player participates, this implies using fewer resources than in prior art systems since the same game session serves two or more players.

Steps 416, 420, 424 and 428 detailed below may be performed in any required order, and any of the steps may be skipped or repeated multiple times with or without executing other steps.

On step 416, one or more gaming commands may be received by the gaming application from any of the end units used by the players. The gaming commands may be provided to the game session, which analyzes the game logic and generates one or more video frames to be displayed to the players.

On step 420 the one or more video frames may be received by the gaming application.

On optional step 424 the gaming application may analyze the one or more video frames for obtaining information related to the game.

The gaming application may then update the infrastructure based on the analysis results. For example, if the analysis of the video and optionally the available infrastructure shows that one of the players has won the game or achieved another goal, for example three wins in a row, the gaming application may reward the player or take any other action.

On step 428 the gaming application may transmit the video stream to the end units used by the first and the second players, such that the players see exactly the same view although they are not collocated and watch different display devices.

Figure 5:
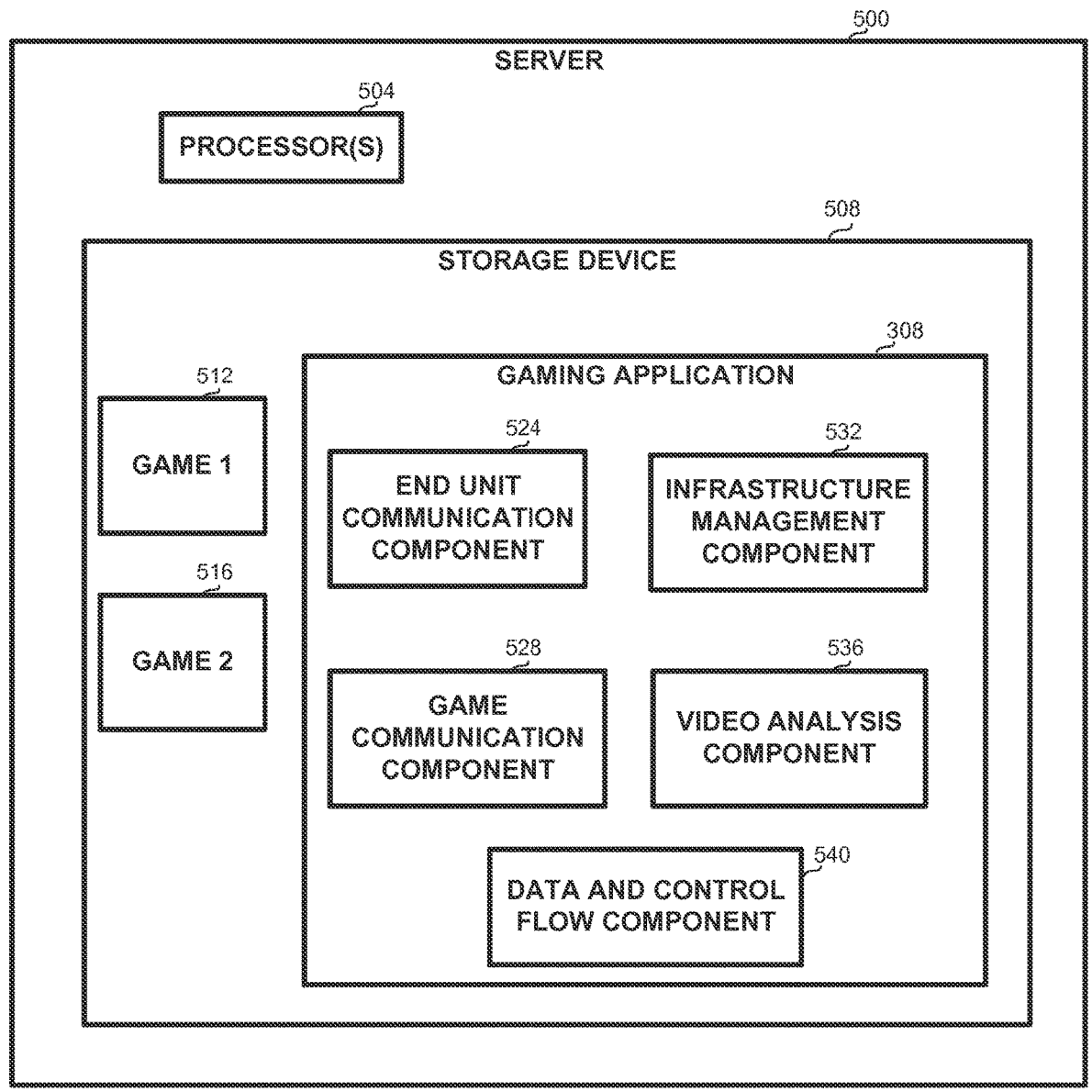
FIG. 5 shows a flowchart of steps in a method for providing multiplayer games in a cloud computing environment, in accordance with some exemplary embodiments of the disclosed subject matter.

Referring now to FIG. 5, showing a block diagram of an apparatus for providing multiplayer games in a cloud computing environment.

The apparatus comprises a server 500, which may be implemented as a computing device. Server 500 may comprise one or more processors 504. Any of processors 504 may be a Central Processing Unit (CPU), a microprocessor, an electronic circuit, an Integrated Circuit (IC) or the like. Alternatively, server 500 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 504 may be utilized to perform computations required by server 500 or any of its subcomponents.

In some embodiments, server 500 may comprise one or more storage devices 508 for storing executable components, and which may also contain data during execution of one or more components. Each storage device 508 may be persistent or volatile. For example, storage device 508 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 508 may retain program code operative to cause any of processors 504 to perform acts associated with any of the steps shown in FIG. 4 above, for example receiving gaming commands and providing video from and to the end units.

The components detailed below may be implemented as one or more sets of interrelated computer instructions, executed for example by any of processors 504 or by another processor. The components may be arranged as one or more executable files, dynamic libraries, static libraries, methods, functions, services, or the like, programmed in any programming language and under any computing environment.

Storage device 508 of server 500 may store one or more games such as game 1 (512) or game 2 (516) which may be executed by processor 504. When executed, each becomes a game session such as game session 312 of FIG. 3. At least one of the games may be a multiplayer game supporting two or more players, similar to multiplayer games executed by console 116 of FIG. 1.

In some embodiments, any of the games may be executed on a different computing platform being in communication with server 500.

Storage device 508 may further comprise gaming application 308, which may launch a game session of one or more games such as game 1 (512) or game 2 (516), and provide communication between the consoles or end units used by one or more players and the executed game. Gaming application 308 may support and provide communication to multiple executed games.

Gaming application 308 may comprise end unit communication component 524 for providing communication to and from one or more of the end units used by the players. The received communication may comprise gaming commands and requests, such as starting a game, performing activities within the game such as moving a control, pressing a button, or the like. Sent communications may comprise sending one or more video frames to be displayed to the players. It will be appreciated that since a single game session is used by multiple players, a single video stream is generated and sent to be displayed to the players.

Gaming application 308 may also comprise game communication component 528 for receiving output from and providing input to an instantiated game such as game 1 (512) or game 2 (516). The output from the game may comprise one or more video frames to be displayed to the players. In some embodiments, wherein the game supports an API, the game may also provide additional data such as a win, a loss, an achievement of a player, or other data related to the logic of the specific game. The input to the game may comprise indications of user actions, such as moving a control, pressing a button, making a selection, or the like.

Gaming application 308 may further comprise infrastructure management component 532 for maintaining and updating infrastructure such as player lists, player characteristics, score counts, awards, player preferences, or the like.

Gaming application 308 may also comprise video analysis component 536 for analyzing the video frames generated by the game, in order to deduce information such as an achievement of one of the players, a win, a loss, or the like.

Yet another component which may be implemented as part of gaming application 308 is data and control flow component 540 for managing the flow of information and control between other components, for example in response to receiving actions from end unit communication component 524, sending the information to the associated game, taking actions in response to events recognized from the video frames or from the users' requests or actions, such as setting turns in which each player is requested to wait while the other one is selecting a tool, managing infrastructure, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:

receiving over a communication channel a first game request for a game from a first end unit corresponding to a first player;

receiving over the communication channel a second game request for the game from a second end unit corresponding to a second player;

storing information regarding pending gaming requests comprising at least one of player characteristics, score counts, awards, or player preferences;

performing a first matching, by a server, to match at least two end units corresponding to players consisting of at least two players, the at least two players comprising at least the first player and the second player, the at least two end units comprising at least the first end unit and the second end unit, the first matching based at least in part on the stored information regarding the pending gaming requests;

responsive to the receiving the first and second game requests and the matching of the at least two end units, launching a single game session for the game on the server for the at least two end units corresponding to the players, such that the players can play together or against each other via their respective end units, the game session comprising its own Application Program Interface (API) adapted for receiving a game command and sending a video stream, wherein the at least two players are located in at least two different geographic locations, and the at least two different geographic locations are remote from the server; and responsive to receiving over the communication channel at the API the game command from either of the at least two end units:

providing the game command to the game session;

in response to the game session receiving and analyzing the game command, receiving, from the API of the game session, the video stream rendered by the API of the game session and configured for transmission remotely to the at least two end units over the Internet, the video stream comprising at least one video frame;

transmitting over the communication channel the at least one video frame to the at least two end units, thereby transmitting a same video stream as rendered by the API of the game session to the two players remotely over the Internet;

analyzing the at least one video frame to obtain information related to the game; and performing a second matching between players based at least in part on the information related to the game, the second matching subsequent to the first matching.

2. The computer-implemented method of claim 1 wherein the at least two players use cloud gaming.

3. The computer-implemented method of claim 1 further comprising maintaining infrastructure related to the game or to at least one of the at least two players.

4. The computer-implemented method of claim 1 wherein the information relates to one player winning an instance of the game.

5. The computer-implemented method of claim 1 wherein the information relates to an achievement of one player.

6. The computer-implemented method of claim 1 further comprising transmitting a wait notice to one of the at least two end units wherein a user of another of the at least two end units is selecting a tool or an avatar.

7. An apparatus having a processing unit and a storage device, the apparatus comprising:
a gaming application comprising:
a game session for a game, for an end unit communication component for receiving, over a communication channel over the Internet, a game command from either of at least two end units, which at least a first player and a second player play together or against each other via their respective end units, and transmitting remotely over the Internet using the communication channel a same video stream to the at least two end units located in at least two remote locations the game session comprising its own Application Program Interface (API) adapted for receiving and analyzing the game command and rendering the video stream, the same video stream rendered by the API of the game session in response to the game session receiving and analyzing the game command;
a game communication component for transmitting the input to a game and receiving the video stream from the executed game, wherein the gaming application is a single gaming application launched upon:
receiving over the communication channel a first game request from a first end unit corresponding to the first player;
receiving over the communication channel a second game request from a second end unit corresponding to the second player; and
performing a first matching, by a server, to match the at least two end units corresponding to at least two players, the at least two players comprising at least the first player and the second player, and wherein the gaming application communicates with the at least two end units, and is executed by the server located remote from the at least two remote locations;
an infrastructure maintenance component for storing information regarding pending gaming requests comprising at least one of player characteristics, score counts, awards, or player preferences, the first matching based at least in part on the stored information regarding the pending gaming requests; and
a video analysis component for analyzing at least one video frame of the video stream to obtain information related to the executed game, and performing a second matching between players based at least in part on the information related to the executed game, the second matching subsequent to the first matching.

8. The apparatus of claim 7 wherein the gaming application provides for cloud gaming.

9. The apparatus of claim 7 further comprising an infrastructure maintenance component for maintaining information related to the game or to a player using at least one of the at least two end units.

10. The apparatus of claim 7 wherein the information relates to one player winning an instance of the game.

11. The apparatus of claim 7 wherein the information relates to an achievement of one player.

12. A computer program product comprising:
a non-transitory computer readable medium;
a first program instruction for receiving over a communication channel a first game request for a game from a first end unit corresponding to a first player;
a second program instruction for receiving over the communication channel a second game request for the game from a second end unit corresponding to a second player;
a third program instruction for storing information regarding pending gaming requests comprising at least one of player characteristics, score counts, awards, or player preferences;
a fourth program instruction for performing a first matching, by a game server, to match at least two end units corresponding to players comprising at least two players, the at least two players comprising at least the first player and the second player, the at least two end units comprising at least the first end unit and the second end unit, the first matching based at least in part on the stored information regarding the pending gaming requests;
a fifth program instruction for launching a single game session for the game on the game server responsive to receiving requests by the first player and the second player, and the matching of the at least two end units of the at least two players, such that the players can play together or against each other via their respective end units, the game session comprising its own Application Program Interface (API) adapted for receiving a game command and sending a video stream, wherein the at least two players are located in at least two different geographic locations, and the at least two different geographic locations are remote from the server;
a sixth program instruction for receiving over the communication channel at the API the game command from either of the at least two end units;
a seventh program instruction for providing the game command to the game session;
in response to the game session receiving and analyzing the game command, an eighth program instruction for receiving, over the communication channel from the API of the game session, the video stream rendered by the API of the game session and configured for transmission remotely to the at least two end units over the Internet, the video stream comprising at least one video frame;
a ninth program instruction for transmitting over the communication channel the at least one video frame to the at least two end units, thereby transmitting a same video stream as rendered by the API of the game session to the two players remotely over the Internet;
a tenth program instruction for analyzing at least one video frame of the video stream to obtain information related to the game, and performing a second matching between players based at least in part on the information related to the game, the second matching subsequent to the first matching,
wherein said first, second, third, fourth, fifth, sixth, seventh, eighth, ninth, and tenth program instructions are stored on said non-transitory computer readable medium.

13. The computer-implemented method of claim 1 wherein matching the at least two players is based upon skill level or geographic location.

14. The apparatus of claim 7 wherein matching the at least two players is based upon skill level or geographic location.

\* \* \* \* \*